United States Patent [19]

Fukasaku et al.

[11] 4,274,036

[45] Jun. 16, 1981

[54] ROTATIONAL SPEED CONTROL CIRCUIT FOR A D.C. MOTOR

[75] Inventors: Yoshinori Fukasaku, Hitachi; Kunihiro Noto, Katsuta, both of Japan

[73] Assignee: Hitachi, Ltd., Tokyo, Japan

[21] Appl. No.: 4,881

[22] Filed: Jan. 19, 1979

[30] Foreign Application Priority Data

Feb. 3, 1978 [JP] Japan ................................. 53-10504

[51] Int. Cl.³ .............................................. H02P 5/16
[52] U.S. Cl. ................................. 318/331; 318/345 F; 318/345 AB; 318/317
[58] Field of Search ......... 318/345 F, 345 B, 345 AB, 318/331, 317, 345 CA; 323/22 T

[56] References Cited

U.S. PATENT DOCUMENTS

| | | | |
|---|---|---|---|
| 3,231,808 | 1/1966 | McDaniel | 318/345 B |
| 3,250,981 | 5/1966 | Marks | 323/22 T |
| 3,447,056 | 5/1969 | Kosaka et al. | 318/332 |
| 3,568,027 | 3/1971 | Bacon et al. | 318/331 |

Primary Examiner—David Smith, Jr.
Attorney, Agent, or Firm—Craig and Antonelli

[57] ABSTRACT

A rotational speed control circuit for a D.C. motor includes a power transistor with its emitter-collector path connected in series with the D.C. motor and a power supply. A base current of the power transistor is controlled by an output of a differential amplifier which is supplied at its one of input terminals with a constant voltage and at the other input terminal with a voltage changing in accordance with a terminal voltage of the D.C. motor. Further the latter input terminal of the differential amplifier is given a variable bias potential by means of an adjustable mechanism. By this circuit configuration, the rotational speed of the D.C. motor can be continuously and proportionally adjusted over a wide range and once the rotational speed is set to predetermined value by the adjustable mechanism, a stable and constant speed control for the D.C. motor can be achieved.

10 Claims, 2 Drawing Figures

ROTATIONAL SPEED CONTROL CIRCUIT FOR A D.C. MOTOR

BACKGROUND OF THE INVENTION

This invention relates to a rotational speed control circuit for a D.C motor and particularly pertains to a control circuit for a variable rotational speed motor for use in a blower of an air conditioner for a motor vehicle.

In a conventional control circuit for a D.C motor, there is provided a power transistor with its emitter-collector path connected in series with the D.C motor and a D.C power source. The speed control of the D.C motor is accomplished by changing a base current delivered to the power transistor thereby varying a current flow passing through the D.C motor. In case where the D.C motor is used for a blower of an air conditioner for motor vehicles, an undersirable change in the rotational speed of the motor is caused by variations in a load and a source voltage of the motor due to the changing-over of the air passage and other operational conditions. The undesirable change in the rotational speed will invite the shortage of the amount of air blown and provide an enhancement of a blower noise.

It is accordingly desired for the blower to operate at substantially constant speed without regard to changes in a load and a source voltage. The rotational speed of the blower is also desired to be controllable over a wide range in a continuous manner so that the amount of air blown can be continuously adjusted in response to various requirements.

In order to meet the desirabilities mentioned above, it is well known to provide a differential amplifier for the detection of a change in the voltage across the D.C motor. The output of the differential amplifier is delivered to a base electrode of a power transistor with its emitter-collector path connected in series with the motor so that the voltage across the motor may be maintained at substantially constant value. The rotational speed of the motor is adjustable by changing a resistance of an element connected to a common emitter of the differential amplifier.

A disadvantage of the above-mentioned prior art is that a controllable range of the rotational speed of the D.C motor is insufficient for use in the blower of the air conditioner. This is because a base current of the power transistor can be controlled only within the range of collector current flowing through one of the differential amplifier transistors to which the power transistor is connected. The current flow passing through the impedance element connected to the common emitter of the differential amplifier is divided into two to flow through each emitter-collector path of transistors. It follows therefore that the output of the differential amplifier, that is, the collector current of one of the transistors becomes relatively small in value.

SUMMARY OF THE INVENTION

One of the object of the present invention resides in providing a rotational speed control circuit for a D.C motor wherein the rotational speed can be adjusted over a wide range in a continuous manner.

Another object of the present invention resides in providing a control circuit for a D.C motor in which the rotational speed of the D.C motor can be maintained at any set value irrespective of changes in a load and a source voltage thereof.

A still another object of the present invention is to provide a control circuit for a D.C motor suitable for use in a blower of an air conditioner for motor vehicles.

According to one aspect of the present invention, there is provided a differential amplifier, one input terminal of which is applied with a voltage changing in accordance with both an armature voltage and a source voltage of the D.C motor and the other input terminal of which is applied with a predetermined reference voltage. An output of the differential amplifier is applied to a base electrode of a power transistor with its emitter-collector path connected in series with the D.C motor and the power source.

According to another aspect of the present invention, an adjustable means is provided to adjust a bias potential of the one of the input terminals of the differential amplifier. The other objects and features of the present invention will become more apparent from the following detailed description which is read in conjunction with the accompanying drawings.

DETAILED DESCRIPTION OF THE PREFERRED EMBODIMENT

Figure 1:
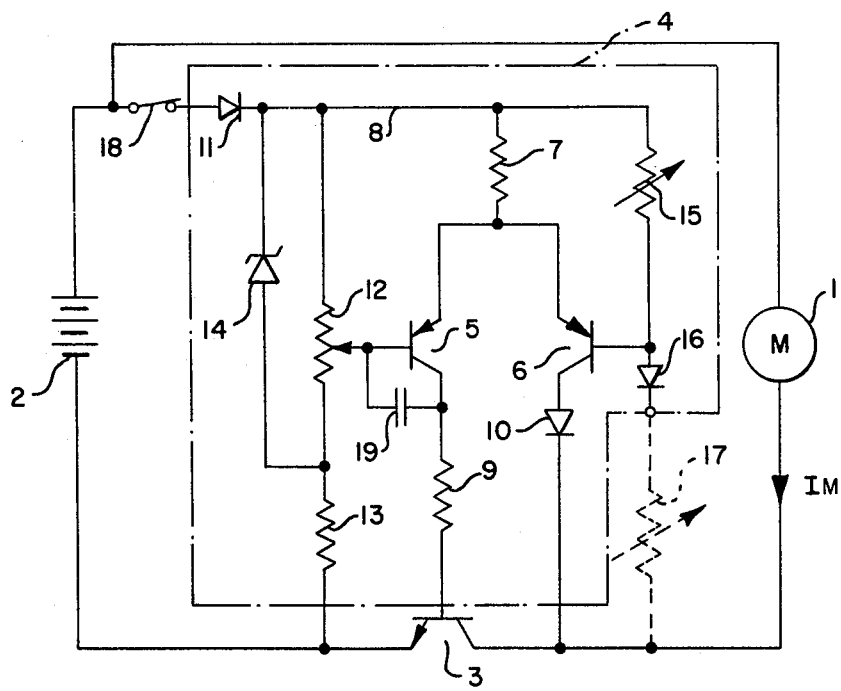
FIG. 1 is a circuit diagram showing a preferred embodiment of a rotational speed control circuit according to the present invention.

Referring now to FIG. 1, a D.C motor 1 is connected through an emitter-collector path of a power transistor 3 across a D.C power source 2 such as a storage battery. A control circuit 4 for controlling the base current of the power transistor 3 comprises mainly of a pair of transistors 5 and 6 which are connected to constitute a differential amplifier. Although in this Figure, the transistors 5 and 6 are illustrated as PNP-conductivity type, NPN conductivity type transistors can be, of course, utilized with some well known modifications in the control circuit 4. The emitters of the transistors 5 and 6 are connected in common through a resistor 7 to a conductor 8. The transistor 5 is connected at its collector to a base of the power transistor 3 through a current limiting resistor 9, while the transistor 6 is connected at its collector to a collector of the power transistor 3 through a reverse current blocking diode 10. Connected across the battery 2 is a series circuit comprising a diode 11, a potentiometer 12 and a fixed resistor 13. The potentiometer 12 and the resistor 13 constitute a divider circuit for the battery voltage. A zener diode 14 is connected across the potentiometer 12 so as to render constant the voltage appearing thereacross whereby a base of the transistor 5 connected with a movable contact of the potentiometer 12 is held at a given constant potential. In another word, one of input terminals of the differential amplifier is given a constant voltage.

On the other hand, another divider circuit comprising a half-fixed resistor 15, a diode 16 and a variable resistor 17 is connected across the motor 1 to divide a voltage developed thereacross. The voltage thus divided is applied to a base of the transistor 6 which is connected to a junction between the resistor 15 and the diode 16. By means of this divider circuit, the other of input terminals of the differential amplifier is given the voltage which changes in value in response to the terminal voltage of the motor 1. The variable resistor 17 shown by dotted line is adjustable by means of an external adjusting mechanism (not shown) to establish an appropriate potential at the base of the transistor 6. The control circuit 4 is connected to the battery 2 through a manual switch 18 and a reverse current blocking diode 11 while the motor 1 is connected directly to the battery. The reason that the manual switch 18 is connected between the battery 2 and the control circuit 4 rather than between the battery 2 and the motor 1 is mainly because the electric current flowing the control circuit 4 is smaller in value than that passing through the motor 1 so that a small capacity of switch can be utilized. This is obviously advantageous from the viewpoint of life time of the manual switch.

The control circuit 4 enclosed by a dotted line is usually formed on a single substrate and is mounted together with the power transistor at an appropriate place inside a fan-casing of a blower so that a pair of transistors 5 and 6 forming the differential amplifier operate at substantially the same ambient temperature thereby eliminating an undesirable influence due to changes in the atmospheric temperature. Both the transistors 5 and 6 are desirable to have the same characteristics and the same capacity. The base potential adjusting means 17 is, in this embodiment, a variable resistor which is provided separately from the control circuit 4 formed on the single substrate. Since the variable resistor 17 is connected at one end to the diode 16 and at the other end to an interconnection between the motor 1 and the power transistor 3, the substrate for the control circuit 4 is required to have only one terminal for the connection to the variable resistor 17. This variable resistor 17 is installed in a control box mounted on an instrument panel of a motor vehicle so that its resistance can be adjusted by means of an externally adjusting mechanism such as a manual lever and a power servo-mechanism.

Each of diodes 10 and 16 functions to prevent a reverse current flow which tends to pass from the motor 1 through both the base-emitter path and the collector-emitter path of the transistor 6 and the emitter-base path of the transistor 5 when the switch 18 is turned off but the motor 1 continues rotating by its inertia so as to induce electric current there through. The reverse electric current will eventually cause an undersirable current passing through the emitter-collector path of the transistor 5 to render the transistor 3 conductive in spite of the switch 18 being turned off.

A condenser 19 connected across the base and the collector of transistor 5 serves to eliminate noises led from the D.C power supply 2 to the input terminal of the differential amplifier. The resistor 9 is selected in value to have lower resistance than the resistor 7 so as to reduce a drift due to variations in ambient temperatures, Operation of the embodiment according to the present invention will be described with reference to FIG. 1 and FIG. 2.

For an exemplary illustration, the power supply 2 is assumed to provide 12 volts and the Zener diode 14 functions to develop a constant voltage of 6 volts across the potentiometer 12. The variable resistor 17 has 0Ω at the minimum and 1 KΩ at the maximum. Under the condition that the variable resistor 17 is of its minimum resistance, the potentiometer 12 is adjusted so as to provide 2 volts at the base of the transistor 5 to thereby minimize the current flowing through the transistor 5. Conversely, under the condition that the variable resistor 17 is of its maximum resistance, the half-fixed resistor 15 is adjusted so as to provide 12 volts at the base of the transistor 6 to thereby maximize the current flow passing through the transistor 6.

Figure 2:
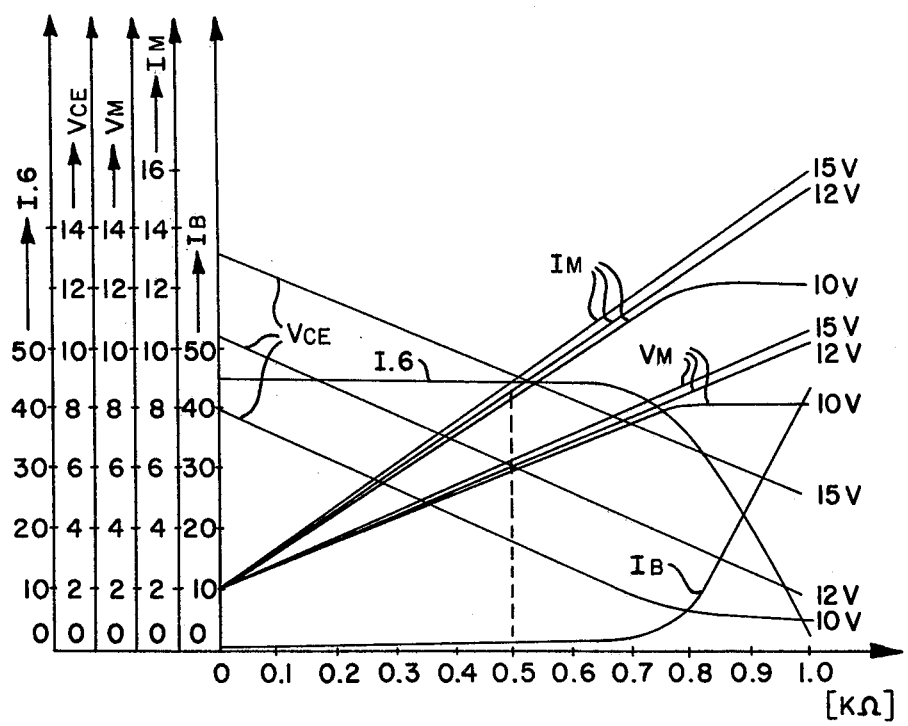
FIG. 2 shows characteristic curves of the control circuit illustrated in FIG. 1.

FIG. 2 shows changes in a base current $I_B$ of the power transistor 3, a voltage $V_{CE}$ across the collector and emitter of the transistor 3, a voltage $V_M$ across the motor 1, a current $I_M$ flowing through the motor 1 and the collector-emitter path of the transistor 3 and a collector current $I_6$ of the transistor 6 as the variable resistor 17 changes in its value from 0Ω to 1 KΩ at different D.C. supply voltages of 15 volts, 12 volts and 10 volts respectively.

As can be seen from this Figure, when the resistance of resistor 17 varies under the condition that the D.C. voltage supply 2 is of 12 volt, the collector current $I_6$ of the transistor 6 varies in accordance with a curve shown at $I_6$ so that the base current $I_B$ of the power transistor 3 changes as shown by $I_B$. As a result, the collector current of the power transistor 3 (equal to the motor current $I_M$) changes from 2 amperes to about 15 amperes substantially in proportion to the change in the resistance of the resistor 17 as shown at $I_M$ (12 V) in FIG. 2. On the other hand, the voltage drop $V_{CE}$ across the emitter-collector path of the power transistor 3 changes from about 10 volts to 2 volts in an inversed proportional relation with the resistance of the resistor 17 as shown at $V_{CE}$ (12 V), therefore the terminal voltage $V_M$ of the motor 1 varies in proportion to the resistance as shown at a curve $V_M$ in FIG. 2.

Because the rotational speed of the motor is proportional to an voltage induced in the motor 1, which is equal to the terminal voltage of the motor 1 minus voltage drop across an armature winding, the control circuit described in connection with FIG. 1 can provide the motor 1 with the rotational speed changing continuously in proportion to the resistance of the resistor 17 over a wide range.

According to the present invention, the rotational speed of the motor 1 can be maintained at set value without regard to changes in a load of the motor and a battery voltage in the following way.

When the D.C. voltage of the power supply 2 is increased or the load of the motor 1 is decreased to increase the rotating speed of the motor 1, it will result in a rise in the induced voltage across the armature winding of the motor 1. Therefore the voltage drop across the resistor 15 increases so that the current flowing through the transistor 6 increases while the current through the transistor 5 decreases. This results in the decrease in the base current of the power transistor 3 thereby causing a rise in the voltage across the emitter-collector path of the power transistor 3. Since the motor 1 is applied with the battery voltage 2 minus the voltage $V_{CE}$ across the power transistor 3, the rise of the voltage $V_{CE}$ results in maintaining the terminal voltage of the motor 1 to be substantially constant even though the D.C. voltage of the power supply 2 is increased or the load of the motor 1 is decreased. By way of an example, when the motor 1 rotates at the speed corresponding to 0.5 KΩ of the resistor 17, the D.C. voltage of the power supply is assumed to change from 12 volts to reach 15 volts. In this case, the voltage $V_{CE}$ across the transistor 3 rises from 6 volts to 9 volts as can be seen in FIG. 2, so that the terminal voltage of the motor 1 is maintained substantially constant.

Conversely, when the D.C. voltage of the power supply 2 is reduced or the load of the motor 1 is increased so that the rotating speed of the motor 1 is reduced, a voltage induced in the armature winding of the motor is also decreased. Accordingly this results in the decrease in the voltage drop across the resistor 15 thereby causing an increase in the current flow through the emitter-collector path of the transistor 5 into the base of the power transistor 3. As a result, the voltage appearing across the emitter-collector path of the power transistor 3 decreases so that the terminal voltage of the motor 1 can be maintained substantially constant.

By way of an example, it is assumed that the motor 1 rotates at a constant speed under the condition that the variable resistor 17 is of 0Ω. Under this condition, if the voltage of the power supply 2 is reduced by 2 volts, the voltage $V_{CE}$ of the transistor 3 is also decreased by about 2 volts.

It will be apparent from the foregoing that the terminal voltage of the motor is held substantially constant even if the D.C. voltage of the power supply 2 varies, therefore a constant speed control for the D.C. motor 1 can be achieved. In the similar manner, the terminal voltage of the D.C. motor 1 is maintained constant even though the load of the motor 1 changes.

Although a specific embodiment of the present invention has been shown as employing various NPN or PNP transistors connected in a particular way, it will be understood by those skilled in the art that any transistor may be replaced by one of opposite types with appropriate modification in the wiring connections. Accordingly it is intended the appended claims embrace control circuit employing either PNP or NPN transistor.

We claim:

1. A rotational speed control circuit for a D.C. motor comprising:
   (a) a power transistor having a base, emitter and collector with its emitter-collector path connected in series with the D.C. motor and a D.C. power supply with the emitter being connected to said D.C. power supply and the collector being connected to said D.C. motor, said power transistor being controllable in response to a control signal applied to the base thereof;
   (b) a differential amplifier including first and second transistors each having a base, emitter and collector, the emitters of said first and second transistors being coupled with each other, the collector of said first transistor being connected to the base of said power transistor and the collector of said second transistor being connected to the collector of said power transistor;
   (c) a first divider circuit for dividing a voltage of said D.C. power supply to apply to the base of said first transistor, said divider circuit including means for stabilizing the base voltage of said first transistor without regard to a change in voltage across the D.C. motor; and
   (d) a second divider circuit for dividing the voltage across said D.C. motor to apply to the base of said second transistor.

2. A rotational speed control circuit for a D.C. motor as defined in claim 1, wherein the collector of said second transistor is coupled to said D.C. power supply through the emitter-collector path of said power transistor, said control circuit enabling operation of the rotational speed of said D.C. motor at a constant value independently of changes in load and source voltage of said D.C. motor and adjustable operation of the rotational speed of said D.C. motor over a wide range in a continuous manner.

3. A rotational speed control circuit for a D.C. motor as defined in claim 2, wherein the collector of said second transistor is only connected to said power transistor at the collector of said power transistor.

4. A rotational speed control circuit for a D.C. motor as defined in claim 1, wherein said first divider circuit includes a series circuit of a potentiometer and a fixed resistor connected across said D.C. power supply and a movable contact of said potentiometer is connected with the base of said first transistor so as to set the base potential at desired value.

5. A rotational speed control circuit for a D.C. motor as defined in claim 4, wherein said stabilizing means comprises a zener diode connected across said potentiometer so as to render constant the voltage applied across the potentiometer.

6. A rotational speed control circuit for a D.C. motor as defined in claim 4 wherein said first divider circuit is connected through a diode and a switch means across said D.C. power supply.

7. A rotational speed control circuit for a D.C motor as defined in claim 1 wherein said second divider circuit includes a series circuit of a resistor and a variable resistor connected across the D.C. motor, said variable resistor being coupled to an external adjusting mechanism by which a resistance of said variable resistor can be changed.

8. A rotational speed control circuit for a D.C. motor as defined in claim 1, wherein said divider circuit is connected through a diode and a switch means across the D.C. motor.

9. A rotational speed control circuit for a D.C. motor as defined in claim 1, wherein said second transistor is connected at its collector to one of terminals of the D.C. motor.

10. A rotational speed control circuit for a D.C motor as defined in claim 9, wherein said second transistor is connected at its base and collector to said one of terminals of the D.C. motor through respective diodes to prevent a reverse current flow.

* * * * *